(12) United States Patent
Kolev et al.

(10) Patent No.: US 6,377,801 B1
(45) Date of Patent: Apr. 23, 2002

(54) METHODS, SATELLITE USER TERMINALS, SWITCHING CENTERS AND SYSTEMS FOR SELECTIVELY CONDUCTING CALLS IN A SATELLITE RADIOTELEPHONE SYSTEM AS DUAL HOP CALLS

(75) Inventors: Javor Kolev; Ramanathan Asokan, both of Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/374,803

(22) Filed: Aug. 16, 1999

(51) Int. Cl.[7] .................................................. H04Q 7/20
(52) U.S. Cl. .................. 455/428; 455/427; 455/430; 320/316; 320/323; 320/324
(58) Field of Search ................................ 455/427, 12.1, 455/121, 13.1, 13.2, 422, 428, 430, 435, 440, 429, 432, 433, 434, 445, 456, 502, 517, 466; 370/401, 338, 323, 316, 324, 310

(56) References Cited

U.S. PATENT DOCUMENTS

| | | | | |
|---|---|---|---|---|
| 5,596,330 A | * | 1/1997 | Yokev et al. ............... | 342/387 |
| 5,956,646 A | * | 9/1999 | Kolev et al. ............... | 455/502 |
| 6,081,709 A | * | 6/2000 | Karabinis ................... | 455/427 |
| 6,108,318 A | * | 8/2000 | Kolev et al. ............... | 370/323 |
| 6,198,921 B1 | * | 3/2001 | Youssefzadeh et al. ..... | 455/428 |
| 6,230,026 B1 | * | 5/2001 | Schwaller et al. | |
| 6,278,876 B1 | * | 8/2001 | Joshi et al. ................. | 455/427 |

FOREIGN PATENT DOCUMENTS

| WO | WO 98/25239 | 6/1998 |
|---|---|---|
| WO | WO 98/39857 | 9/1998 |

* cited by examiner

*Primary Examiner*—Daniel Hunter
*Assistant Examiner*—Pablo N Tran
(74) *Attorney, Agent, or Firm*—Myers Bigel Sibley & Sajovec

(57) ABSTRACT

Calls in the satellite radiotelephone system are conducted as single or dual hop calls under the control of a satellite radiotelephone that initiates the call. In particular, a first satellite radiotelephone calling a second satellite radiotelephone can configure the call as a dual hop call by transmitting a suspension code to a switching center, thereby possibly avoiding a default action by the switching center to conduct the call a single hop call. The switching center recognizes the suspension code and conducts the call in the active state to the second satellite radiotelephone as a dual hop call. In other words, the suspension code transmitted by the first satellite radiotelephone instructs the switching center to avoid conducting the call as a single hop call which may be the default action performed by the switching center.

28 Claims, 5 Drawing Sheets

METHODS, SATELLITE USER TERMINALS, SWITCHING CENTERS AND SYSTEMS FOR SELECTIVELY CONDUCTING CALLS IN A SATELLITE RADIOTELEPHONE SYSTEM AS DUAL HOP CALLS

FIELD OF THE INVENTION

The present invention relates to the field of communications in general, and more particularly, to call configuration in satellite radiotelephone systems.

BACKGROUND OF THE INVENTION

Satellite radiotelephone communications systems are widely used to provide radiotelephone communications among satellite radiotelephones and with cellular and conventional wired telephones. For example, the satellite radiotelephone system 101 shown in FIG. 1 may allow a first satellite radiotelephone 100 to communicate with a second satellite radiotelephone 105 via a satellite 110. The first and second satellite radiotelephones 100, 105 can conduct a call by transmitting signals from the transmitting satellite radiotelephone to the satellite 110 that relays the signals to a switching center 115 which relays the signals to the receiving satellite radiotelephone via the satellite 110 over first, second, and third channels 120a–c (i.e., a dual hop call). Unfortunately, the dual hop call configuration described above may introduce long delays in signal transmission due to the distance between the first and second satellite radiotelephones 100, 105 and the satellite 110.

Therefore calls in satellite radiotelephone systems 101 between the first and second satellite radiotelephones 100, 105 may be routinely conducted as single hop calls. In particular, the switching center 115 may determine that the first and second satellite radiotelephones 100, 105 are both satellite radiotelephones served via the satellite 110. The call from the first satellite radiotelephone 100 to the second satellite radiotelephone 105 may then be conducted over a transmission path 125 via the satellite 110 (i.e., a single hop). In other words, the single hop configuration may reduce delays in signal transmission by eliminating transmissions between the switching center 115 and the satellite 110 once the call is in an active state. For example, once the second satellite radiotelephone 105 accepts the call, the signals transmitted between the first and second satellite radiotelephones are not routed through the switching center 115.

Unfortunately, the configuration of such single hop calls may introduce some disadvantages. For example, it may be difficult to encode voice data transmitted between the first and second satellite radiotelephones 100, 105 in a single hop configuration. Such encoding is typically performed by systems accessible to the switching center 115 rather than the satellite 110. Consequently, the elimination of signaling between the satellite 110 and the switching center 115 in the single hop call may reduce the accessibility of the encoding systems. In addition, call services, such as call conferencing between three or more parties, is typically performed by systems accessible to the switching center 115. Accordingly, a single hop call configuration may also reduce the availability of those services to the first and second satellite radiotelephones 100, 105 involved in the single hop call.

SUMMARY OF THE INVENTION

It is, therefore, an object of the present invention to provide satellite radiotelephones, systems and methods of operating satellite radiotelephone systems which may provide improved performance in how calls are conducted in satellite radiotelephone systems.

These, and other objects of the present invention, may be provided by methods, user terminals, and systems that conduct calls from a satellite user terminal to a user terminal via a satellite in a satellite radiotelephone system by transmitting information from the satellite user terminal to the satellite radiotelephone system via the satellite. The information includes a request to conduct an active state of the call from the satellite user terminal to the user terminal via a ground segment in the satellite radiotelephone system. The active state of the call is conducted from the satellite user terminal to the user terminal via the ground segment based on the request. In other words, single hop routing of a dual-hop call may be selectively bypassed at the request of a mobile terminal.

In one embodiment of the present invention, the call is conducted as a single or dual hop call under the control of the satellite radiotelephone that initiates the call. In particular, a first satellite radiotelephone calling a second satellite radiotelephone can instruct satellite radiotelephone system to conduct the call as a dual hop call by transmitting a suspension code to a switching center, thereby possibly avoiding a default action by the switching center to configure the call as a single hop. Consequently, data transmitted between the first and second satellite user terminals may be processed by systems available to the ground segment. For example, audio data may be encoded or other users may join the call between the first and second satellite radiotelephones using a teleconference function available to the ground segment.

In a further aspect of the present invention, a determination is made whether the user terminal being called is a second satellite user terminal that communicates with the satellite radiotelephone system via the satellite. The active state of the call is conducted between the satellite user terminal and the user terminal via the ground segment in response to the request if the user terminal is a second satellite user terminal that communicates with the satellite radiotelephone system via the satellite.

In another aspect of the present invention, the information includes a suspension code or suspension message which requests the suspension of single hop call configuration for the active state of the call. The suspension code can comprise a suffix or prefix associated with a telephone number that identifies the second satellite user terminal in the satellite radiotelephone system.

DETAILED DESCRIPTION OF PREFERRED EMBODIMENTS

Figure 1:
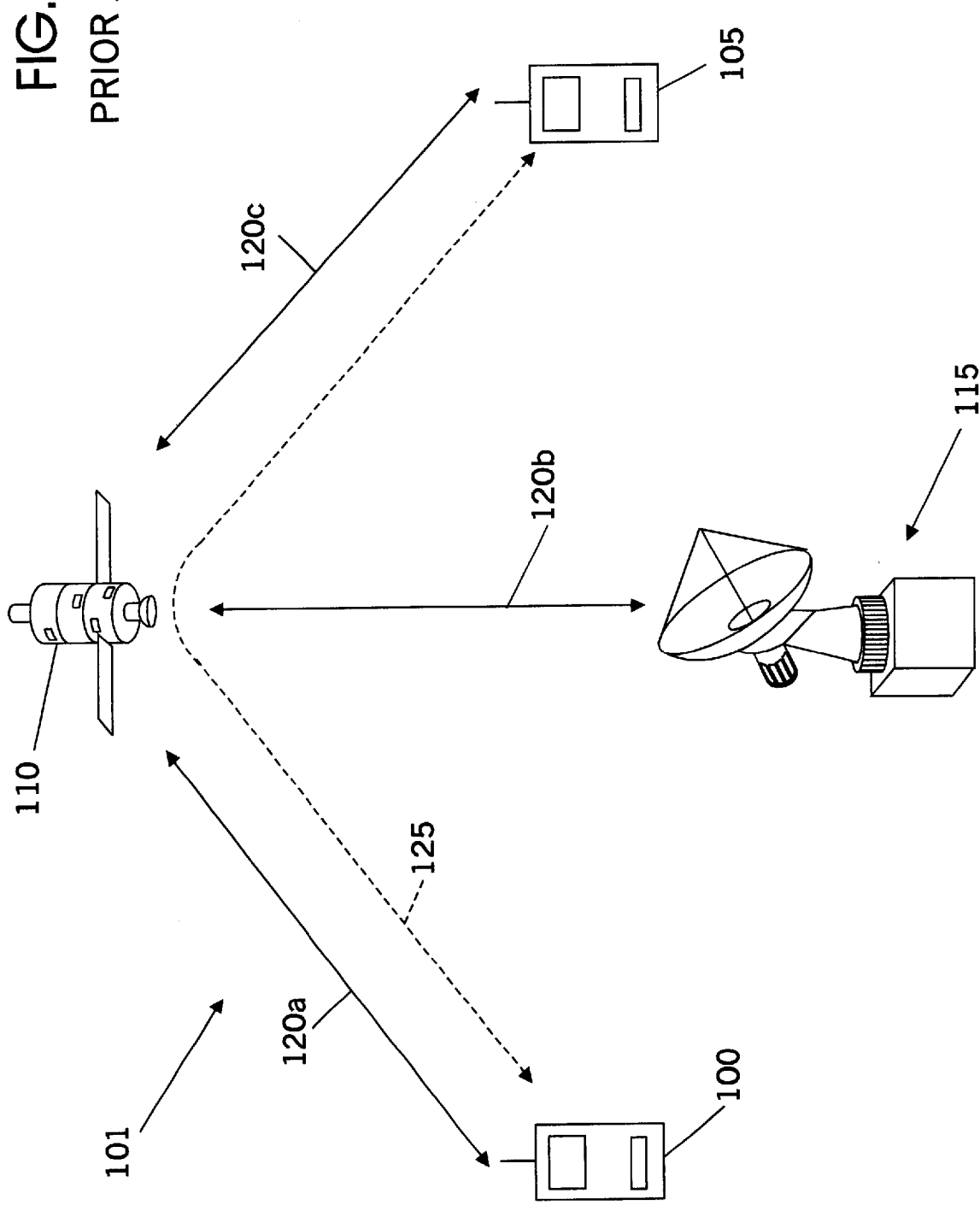
FIG. 1 is a diagram of a conventional satellite radiotelephone system.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention is described using block diagrams and flowcharts. It will be understood that each block (of the block diagrams or flowcharts), and combinations of blocks, can be implemented by computer program instructions. These program instructions may be provided to a processor (s) within the satellite radiotelephone system, satellite radiotelephone, and switching center, such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support combinations of means for performing the specified functions, combinations of steps for performing the specified functions and program instruction means for performing the specified functions. It will also be understood that each block, and combinations of blocks, can be implemented by special purpose hardware-based systems which perform the specified functions or steps, or combinations of special purpose hardware and computer instructions.

The present invention is described herein by reference to satellite radiotelephones operating in satellite radiotelephone systems. It will be understood, however, that the present invention may be utilized with any user terminal that operates in a satellite radiotelephone system including, but not limited to, handheld or desktop computers, personal digital assistants and the like. Furthermore, the present invention is not limited to use in satellite radiotelephone systems. Rather, the present invention may be utilized in any communications system that includes connection types analogous to those described herein. As used herein, the phrase "active state" includes situations wherein data, such as audio data, is being exchanged between satellite radiotelephones. As used herein, the term "ground segment" includes any component of a satellite radiotelephone system to which services, such as data encoding or teleconferencing, are available to be applied to calls conducted by the ground segment.

According to the present invention, a call in a satellite radiotelephone system is conducted as a single or a dual hop call under the control of the satellite radiotelephone that initiates the call. In particular, a first satellite radiotelephone calling a second satellite radiotelephone can instruct a satellite radiotelephone system to conduct the call as a dual hop call by transmitting a suspension code to a ground segment of the satellite radiotelephone system (such as a switching center), to override a default action by the switching center to configure the call as a single hop call.

The ground segment recognizes the suspension code and conducts the call to the second satellite radiotelephone as a dual hop call. In other words, the suspension code transmitted by the first satellite radiotelephone instructs the ground segment to avoid configuring the call as a single hop call.

Figure 2:
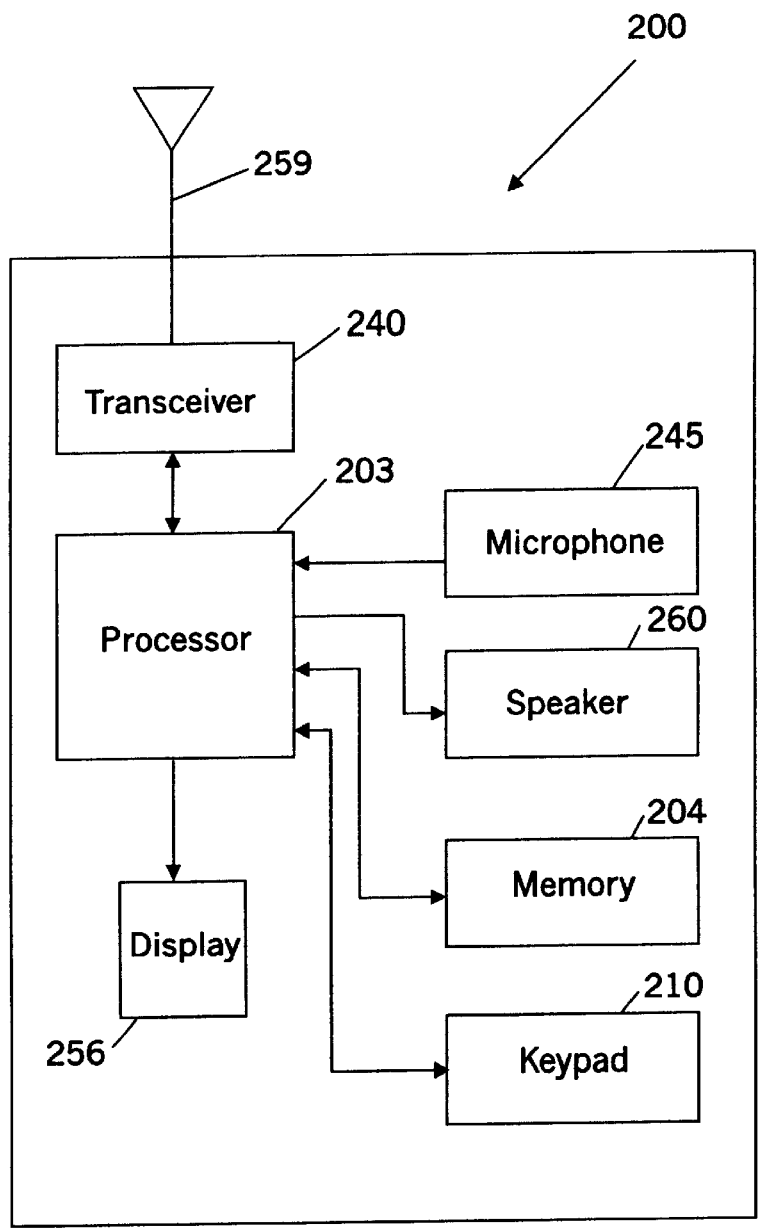
FIG. 2 is a block diagram of an embodiment of a satellite radiotelephone according to the present invention.
Figure 3:
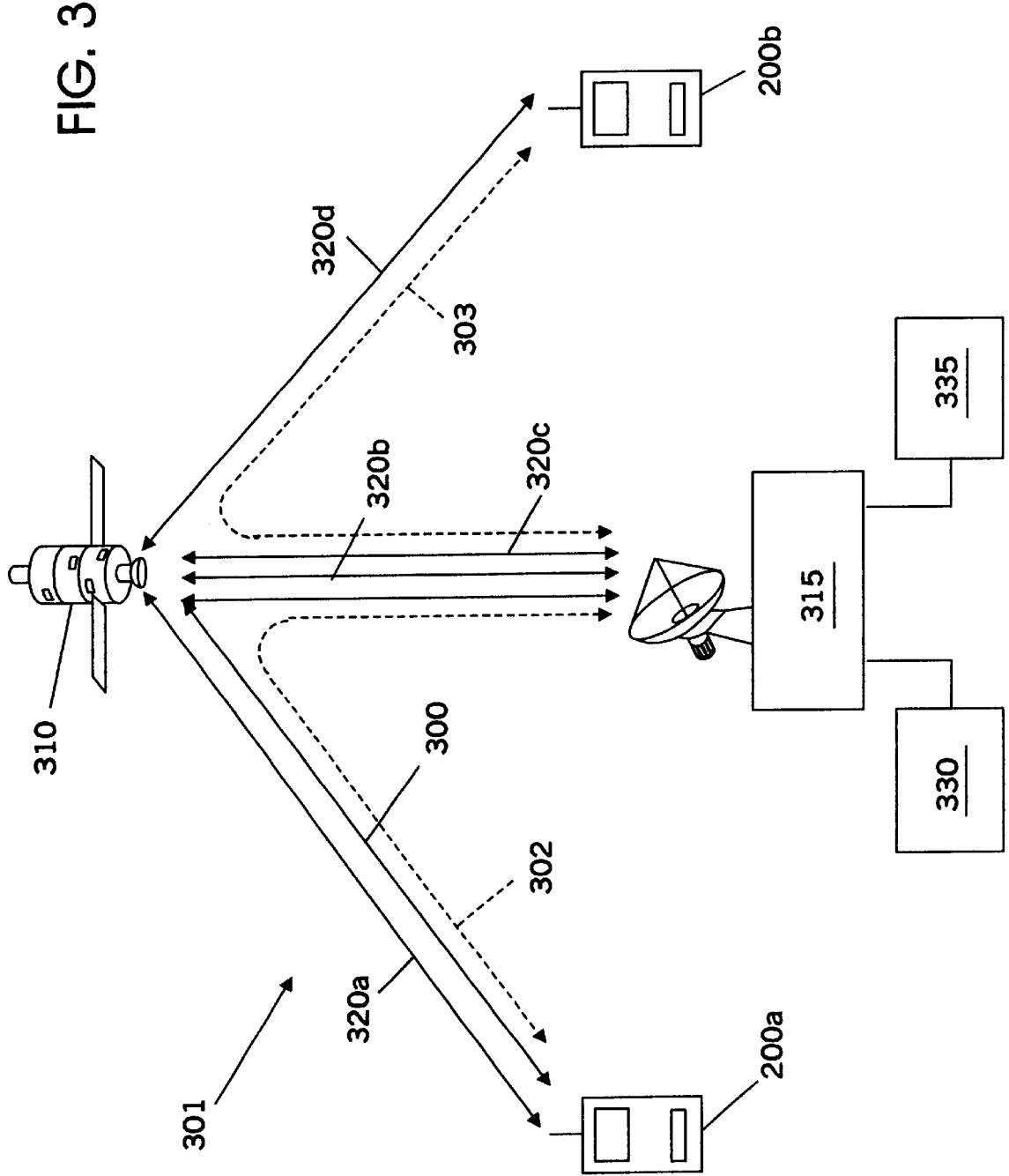
FIG. 3 is a diagram of a satellite radiotelephone system that conducts a call as a dual hop call according to the present invention.

FIG. 2 is a block diagram of an embodiment of a satellite radiotelephone 200 according to the present invention. As shown in FIG. 2, the satellite radiotelephone 200 includes a keypad 210 or other user interface means which can be used to provide input to the satellite radiotelephone 200. In particular, the keypad 210 in the illustrated embodiment includes a plurality of keys that provide input to the satellite radiotelephone 200 when pushed. For example, when the user wishes to initiate a call in the satellite communications system 301 (as shown in FIG. 3), the user pushes a series of keys that correspond to the number to be dialed. During the call, the user can speak into a microphone 245 which causes the satellite radiotelephone 200 to generate communication signals which are transmitted from the satellite radiotelephone 200. The user may listen to a speaker 260 that produces audio signals generated by the satellite radiotelephone 200 from communication signals received by the satellite radiotelephone 200 during a call. The satellite radiotelephone 200 transmits and receives the communication signals via a transceiver 240 over an antenna 259.

During operation, the user may refer to a display 256 of the satellite radiotelephone 200 to observe information relevant to the operation of the satellite radiotelephone 200, such as characters or numbers. For example, the display 256 can be a black and white Liquid Crystal Display (LCD) that displays, for example, a telephone number entered by the user. The display 256 may also be used in conjunction with the keypad 210 such as when the user dials a number to place a call.

A processor 203 provides the communications signals to the transceiver 240 for transmission and receives the communications signals from the transceiver 240 for reception. For example, the processor 203 provides communications signals to the transceiver 240 when the user speaks into the microphone 245 and receives communications signals from the transceiver 240 for the reproduction of audio through the speaker 260. A memory 204 is associated with the processor 203 and can store telephone numbers, service tables, and the like. The processor 203 can comprise an application specific integrated circuit, digital signal processor or general purpose computer that runs software to carry out instructions that correspond to the operation described herein. It will be understood that the satellite radiotelephone 200 can include other components such as a modulator/demodulator and an encoder/decoder and the like known to those of skill and will not be described further herein.

According to the present invention, the satellite radiotelephone 200 transmits signals to the satellite radiotelephone system 301 in order to initiate a call or respond to a page. The transmitted signal may be configured by the processor 203 to include a request to satellite radiotelephone system 301 to conduct the active state of the call from the satellite radiotelephone via a ground segment of the satellite radiotelephone system, such as a switching center. In other words, the request may instruct the satellite radiotelephone system to suspend the default action of configuring the call as a single hop call and, instead, configure the call as a dual hop call.

The request can comprise a prefix or suffix to a number dialed by the user via the keypad 210. For example, the suspension code may comprise a combination of alphanumeric characters associated with the dialed telephone number. The user may dial a prefix or suffix with the telephone number of a destination, whereupon the satellite radiotelephone 200 transmits the telephone number and the prefix or suffix to the satellite radiotelephone system. Alternately, the request can comprise a message or series of messages to the satellite radiotelephone system. The request can be associated with particular telephone numbers such as when stored in the memory 204. When the user recalls the telephone number from the memory 204 and initiates the call, the telephone number and the associated request are transmitted. It will also be understood that the request can take other forms.

FIG. 3 is a diagram of a satellite radiotelephone system 301 that conducts a call as a dual hop call according to the present invention. According to FIG. 3, a first satellite radiotelephone 200*a* initiates a call to a second satellite radiotelephone 200*b* by transmitting the telephone number of the second satellite radiotelephone 200*b* and a suspension code to a switching center 315 via a satellite 310 over a Satellite Dedicated Control Channel (SDCCH) 300*a*. The switching center 315 calls the second radiotelephone 200*b* over a SDCCH 300*b*. The switching center 315 recognizes the first and second satellite radiotelephones 200*a*, 200*b* as being served by the satellite 310. Accordingly, the switching center 315 conducts the active state of the call from the first satellite radiotelephone 200*a* to the second satellite radiotelephone 200*b* over a first hop 302 and a second hop 303 (i.e., as a dual hop call) based on the suspension code transmitted by the first satellite radiotelephone 200*a*. As will be understood by those of ordinary skill in the art, a channel, such as a control channel or a traffic channel, can be defined by a frequency (FDMA), a frequency and a time slot (TDMA), and/or other techniques known in the art.

The switching center 315 designates a first traffic channel 320*a* to carry data between the first satellite radiotelephone 200*a*, via the satellite 310, and the switching center 315. Similarly, the switching center 315 designates a second traffic channel 320*b* to carry data between the radiotelephone 200*b* via the satellite 310 and the switching center 315.

During the call, data, such as audio, is transmitted between the first and second satellite radiotelephones 200*a*, 200*b* via the satellite 310 and the switching center 315 via the respective traffic channels. Accordingly, the data transmitted between the first and second satellite radiotelephones 200 may be processed by systems available to the switching center 315. For example, audio data may be encoded by a first system 330 or other users may join the call between the first and second satellite radiotelephones 200*a*, 200*b* using a teleconference system 335.

Figure 4:
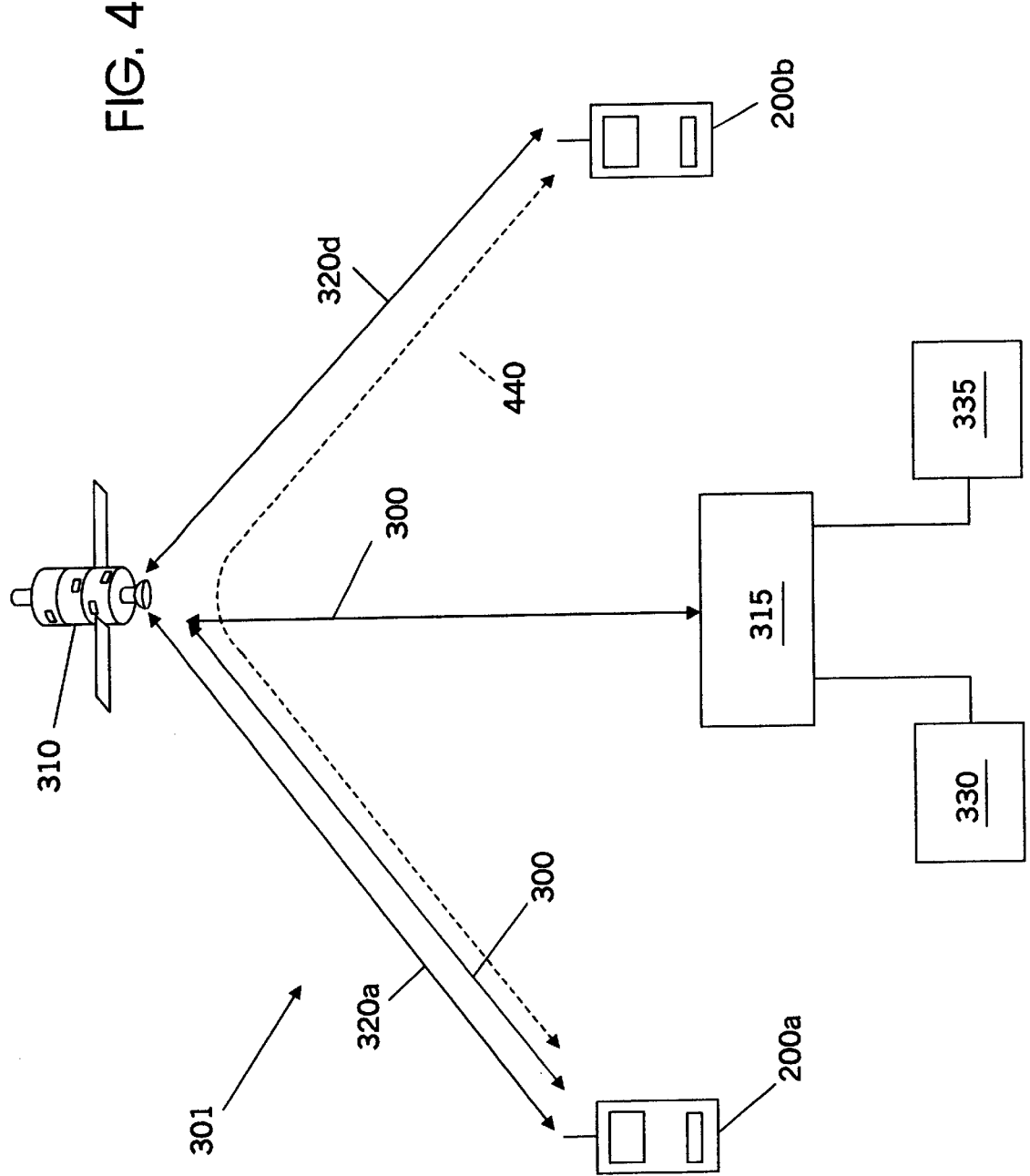
FIG. 4 is a diagram of the satellite radiotelephone system shown in FIG. 3 wherein the call is conducted as a single hop call.

FIG. 4 is a diagram of the satellite radiotelephone system 301 shown in FIG. 3 wherein the call is configured as a single hop call. According to FIG. 4, the first satellite radiotelephone 200*a* initiates a call to the second satellite radiotelephone 200*b* by transmitting the telephone number of the second satellite radiotelephone 200*b*, without the suspension code, to the switching center 315 via the satellite 310 over the SDCCH 300*a*. The switching center 315 calls phone 200*b* over another SDCCH—300*b*. The switching center 315 determines that the first and second satellite radiotelephones 200*a*, 200*b* are satellite radiotelephones served by the satellite 310 and conducts the call as a single hop via a transmission path 440 based on the absence of the suspension code. Accordingly, the call from the first satellite radiotelephone 200*a* to the second satellite radiotelephone 200*b* is established by merging the first traffic channel 320*a* assigned to the first satellite radiotelephone 200*a* with the second traffic channel 320*d* assigned to the second satellite radiotelephone 200*b* at the satellite 310 in single hop channel 440. The data transmitted between the first and second satellite radiotelephones 200*a*, 200*b* is carried over the merged first and second traffic channels 320*a*, 320*d* via the satellite 310.

Figure 5:
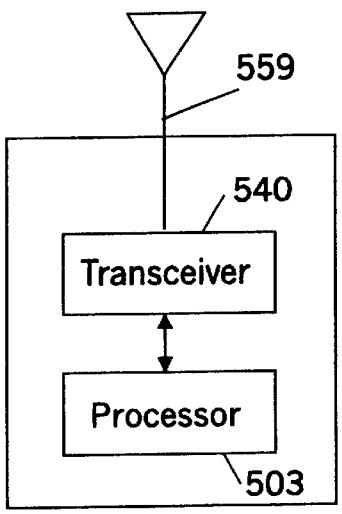
FIG. 5 is a block diagram of an embodiment of a switching center 315 shown in FIGS. 3 and 4 according to the present invention.

FIG. 5 is a block diagram of an embodiment of a switching center 315 as shown in FIGS. 3 and 4 according to the present invention. As shown in FIG. 5, the switching center 315 transmits and receives signals to and from the satellite radiotelephones via a transceiver 540 over an antenna 559. A processor 503 receives the signal from the first satellite radiotelephone 200*a* via the transceiver 540.

The processor 503 configures the call from the first satellite radiotelephone 200*a* to the second satellite radiotelephone 200*b* as a single hop call or a dual hop call based on the information included in the signal received from the first satellite radiotelephone 200*a*. In particular, the processor determines if the destination of the call is a second satellite radiotelephone 200*b* in the satellite radiotelephone system 301. If the processor determines that the destination of the call is in the satellite radiotelephone system 301 and detects the suspension code, the processor sets-up the call as a dual hop call and conducts the call in the active state from the first satellite radiotelephone 200*a* directly to the destination. If the processor determines that the destination of the call is in the satellite radiotelephone system 301, but does not detect the suspension code, the processor configures the call as a single hop call and does not conduct the call in the active state from the first satellite radiotelephone 200*a* directly to the destination, that is, over the satellite 310 and bypassing the switching center 315.

Figure 6:
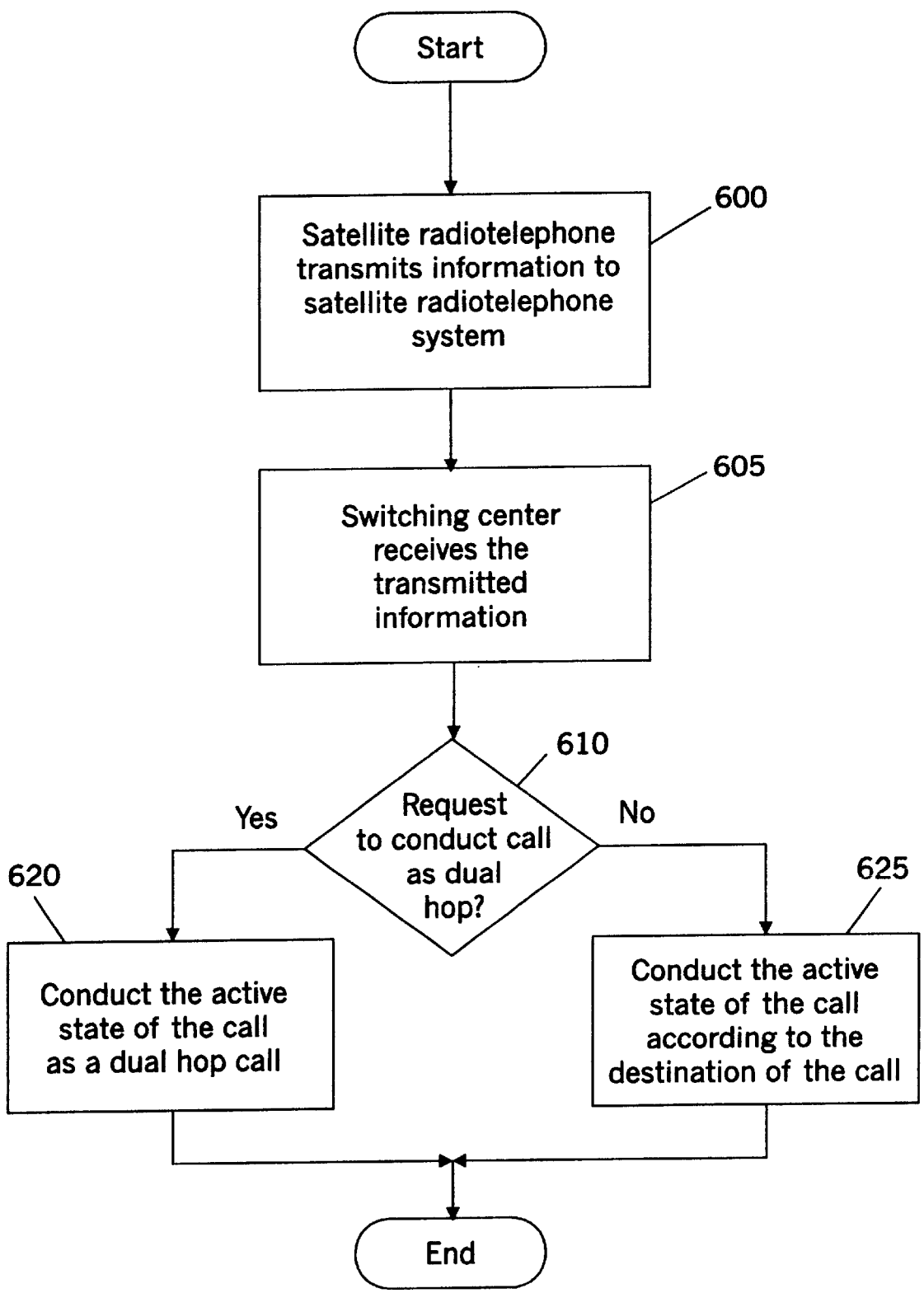
FIG. 6 is a flowchart illustrating operations according to an embodiment of the present invention.

FIG. 6 is a flowchart that illustrates operations of the satellite radiotelephone system 301 shown in FIGS. 3 and 4. As shown in FIG. 6, the first satellite radiotelephone 200*a* initiates a call to a destination device by sending information to the satellite radiotelephone system 301 (block 600). The switching center 315 receives the information (block 605) and determines if the called destination is in the satellite radiotelephone system and served by the same satellite 301 (block 603). If not, the call is connected according to the destination type, e.g., over the landlines (block 608). Otherwise, if the called party is within the satellite radiotelephone system 301 and served by the same satellite (block 603), the switching center determines if the information includes a request to conduct the call as a dual hop call (block 610). If the information includes a request to conduct the call as a dual hop call, the active state of the call is conducted by the switching center 315 as a dual hop call (block 620).

However, if the information does not include a request to conduct the call as a dual hop call (block 610), the active state of the call is conducted according to the destination of the call as a single hop call (block 625).

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of conducting a call from a satellite user terminal to a user terminal via a satellite in a satellite radiotelephone system, the method comprising the steps of:

transmitting information from the satellite user terminal to the satellite radiotelephone system via the satellite, wherein the information includes a request to conduct an active state of the call from the satellite user terminal to the user terminal via a ground segment in the satellite radiotelephone system; and conducting the active state of the call from the satellite user terminal to the user terminal via the ground segment based on the request.

2. The method of claim 1, wherein the step of conducting comprises:

determining whether the user terminal is a second satellite user terminal that communicates with the satellite radiotelephone system via the satellite; and establishing the active state of the call between the satellite user terminal and the user terminal via the ground segment in response to the request if the user terminal is a second satellite user terminal that communicates with the satellite radiotelephone system via the satellite.

3. The method of claim 2, further comprising the step of:

conducting the active state of the call between the satellite user terminal and the user terminal, wherein the user terminal does not communicate with the satellite directly if the user terminal is not a second satellite user terminal that communicates with the satellite radiotelephone system via the satellite.

4. A method of conducting a call from a satellite user terminal to a user terminal via a satellite in a satellite radiotelephone system, the method comprising the steps of:

transmitting information from the satellite user terminal to the satellite radiotelephone system via the satellite, wherein the information includes a request to conduct an active state of the call from the satellite user terminal to the user terminal via a ground segment in the satellite radiotelephone system, wherein the step of transmitting comprises the step of transmitting information from the first satellite user terminal to the satellite radiotelephone system, wherein the information includes at least one of a suspension code and a suspension message which requests the suspension of default single hop call configuration for the active state of the call; and conducting the active state of the call from the satellite user terminal to the user terminal via the ground segment based on the request.

5. The method of claim 4, wherein the suspension code comprises at least one of a suffix and a prefix associated with a telephone number the identifies the user terminal in the satellite radiotelephone system.

6. A method of conducting a call from a first satellite user terminal to a second satellite user terminal via a satellite in a satellite radiotelephone system, the method comprising the steps of:

transmitting information from the first satellite user terminal to the satellite radiotelephone system via the satellite, wherein the information includes a request to suspend single hop call configuration by the satellite radiotelephone system and conduct an active state of the call from the first satellite user terminal to the second satellite user terminal via a ground segment in the satellite radiotelephone system;

receiving channel information from the satellite radiotelephone system that identifies a channel over which the first satellite user terminal communicates with the second satellite user terminal during the active state of the call; and communicating with second satellite user terminal over the channel.

7. The method of claim 6, wherein the step of transmitting comprises the step of transmitting information from the first satellite user terminal to the satellite radiotelephone system, wherein the information includes at least one of a suspension code and a suspension message which requests the suspension of single hop call configuration for the active state of the call.

8. The method of claim 7, wherein the suspension code comprises at least one of a suffix and a prefix associated with a telephone number the identifies the second satellite user terminal in the satellite radiotelephone system.

9. A method of conducting a call from a first satellite user terminal to a second satellite user terminal via a satellite in a satellite radiotelephone system, the method comprising the steps of:

receiving information from the first satellite user terminal via the satellite, wherein the information includes a request to suspend single hop call configuration by the satellite radiotelephone system and conduct an active state of the call from the first satellite user terminal to the second satellite user terminal via a ground segment in the satellite radiotelephone system;

assigning at least one of a dual hop channel configuration and a single hop channel configuration over which the call between the first and second satellite radiotelephones is conducted during the active state of the call, wherein the dual hop channel configuration is assigned when the information includes the request to suspend single hop call configuration by the satellite radiotelephone system and the single hop channel configuration is assigned when the information does not include the request to suspend single hop call configuration by the satellite radiotelephone system; and transmitting the assigned channels in the at least one of the dual hop channel configuration and the single hop channel configuration to the first and second satellite radiotelephone user terminals.

10. The method of claim 9, wherein the step of receiving comprises the step of receiving information from the first satellite user terminal, wherein the information includes at least one of a suspension code and a suspension message which requests the suspension of single hop call configuration for the active state of the call.

11. The method of claim 10, wherein the suspension code comprises at least one of a suffix and a prefix associated with a telephone number the identifies the second satellite user terminal in the satellite radiotelephone system.

12. A method of conducting a call from a first user terminal to a second user terminal in a communications system, the method comprising the steps of:

transmitting information from the first user terminal to the communications system, wherein the information includes a request to suspend single hop call configuration by the communications system and to conduct an active state of the call from the first user terminal to the second user terminal via a ground segment in the communications system; and conducting the active state of the call from the first user terminal to the second user terminal via the ground segment based on the request.

13. The method of claim 12, wherein the first and second user terminals are respective first and second satellite radiotelephones served by a satellite in the communications system.

14. The method of claim 12, wherein the step of transmitting comprises the step of transmitting information from the first user terminal to the communications system, wherein the information includes at least one of a suspension code and a suspension message which requests the suspension of single hop call configuration for the active state of the call.

15. The method of claim 14, wherein the suspension code comprises at least one of a suffix and a prefix associated with a telephone number the identifies the second satellite user terminal in the satellite radiotelephone system.

16. A satellite user terminal that communicates with a satellite radiotelephone system via a satellite in the satellite radiotelephone system, the satellite user terminal comprising:
- a transceiver that transmits and receives signals to and from the satellite radiotelephone system;
- a keypad configured to provide input to the satellite user terminal;
- a processor, responsive to the transceiver and the keypad, that configures a signal for transmission to the satellite radiotelephone system in response to initiating a call to a user terminal, wherein the signal includes a request to conduct an active state of the call from the satellite user terminal to the user terminal via a ground segment in the satellite radiotelephone system.

17. A satellite user terminal that communicates with a satellite radiotelephone system via a satellite in the satellite radiotelephone system, the satellite user terminal comprising:
- a transceiver that transmits and receives signals to and from the satellite radiotelephone system;
- a keypad configured to provide input to the satellite user terminal;
- a processor, responsive to the transceiver and the keypad, that configures a signal for transmission to the satellite radiotelephone system in response to initiating a call to a user terminal, wherein the signal includes a request to conduct an active state of the call from the satellite user terminal to the user terminal via a ground segment in the satellite radiotelephone system, wherein the request comprises at least one of a suspension code and a suspension message which requests the suspension of single hop call configuration for the active state of the call in the satellite radiotelephone system.

18. The satellite user terminal of claim 17, wherein the suspension code comprises at least one of a suffix and a prefix associated with a telephone number transmitted by the satellite user terminal to identify the user terminal.

19. A satellite radiotelephone system comprising:
- a satellite that communicates with a plurality of satellite user terminals in the satellite radiotelephone system;
- a satellite user terminal that transmits a signal to the satellite radiotelephone system via the satellite, wherein the signal includes a request to the satellite radiotelephone system to conduct an active state of a call from the first satellite user terminal to a destination as a dual hop call;
- a switching center, responsive to the satellite and the satellite user terminal, wherein the switching center conducts the call from the satellite user terminal to the destination in the active state based on the request.

20. The satellite radiotelephone system of claim 19, wherein the switching center determines whether the destination is a second satellite user terminal that communicates with the satellite radiotelephone system via the satellite and conducts the active state of the call between the first satellite user terminal and the destination in response to the request, if the destination is a second satellite user terminal that communicates with the satellite radiotelephone system via the satellite.

21. The satellite radiotelephone system of claim 20, wherein the switching center conducts the active state of the call between the satellite user terminal and the destination, wherein the destination does not communicate with the satellite directly if the destination is not a second satellite user terminal that communicates with the satellite radiotelephone system via the satellite.

22. The satellite radiotelephone system of claim 19, wherein the satellite user terminal transmits information that includes at least one of a suspension code and a suspension message which requests the suspension of single hop call configuration for the active state of the call.

23. The satellite radiotelephone system of claim 22, wherein the suspension code comprises at least one of a suffix and a prefix associated with a telephone number the identifies the second satellite user terminal in the satellite radiotelephone system.

24. A switching center that communicates with a plurality of satellite user terminals in a satellite radiotelephone system via a satellite in the satellite radiotelephone system, the switching center comprising:
- a transceiver that transmits and receives signals to and from the plurality of satellite user terminals; and
- a processor, responsive to the transceiver, wherein the processor receives a request from a first satellite user terminal to conduct an active state of a call initiated by the first satellite user terminal to a destination, and that conducts the call from the first satellite user terminal to the destination in the active state based on the request.

25. The switching center of claim 24, wherein the processor determines whether the destination is a second satellite user terminal that communicates with the satellite radiotelephone system via the satellite and conducts the active state of the call between the first satellite user terminal and the destination in response to the request, if the destination is a second satellite user terminal that communicates with the satellite radiotelephone system via the satellite.

26. The switching center of claim 24, wherein the processor conducts the active state of the call between the satellite user terminal and the destination, wherein the destination does not communicate with the satellite directly if the destination is not a second satellite user terminal that communicates with the satellite radiotelephone system via the satellite.

27. A switching center that communicates with a plurality of satellite user terminals in a satellite radiotelephone system via a satellite in the satellite radiotelephone system, the switching center comprising:
- a transceiver that transmits and receives signals to and from the plurality of satellite user terminals; and
- a processor, responsive to the transceiver, wherein the processor receives a request from a first satellite user terminal to conduct an active state of a call initiated by the first satellite user terminal to a destination, and that conducts the call from the first satellite user terminal to the destination in the active state based on the request, wherein the signals received from the first satellite user terminal include at least one of a suspension code and a suspension message which requests the suspension of single hop call configuration for the active state of the call.

28. The switching center of claim 27, wherein the suspension code comprises at least one of a suffix or prefix associated with a telephone number the identifies the second satellite user terminal in the satellite radiotelephone system.

* * * * *